(12) United States Patent
Haddad

(10) Patent No.: US 10,238,142 B1
(45) Date of Patent: Mar. 26, 2019

(54) CIGARETTE RACK WITH INVENTORY CHECK

(71) Applicant: Baker Haddad, Santa Barbara, CA (US)

(72) Inventor: Baker Haddad, Santa Barbara, CA (US)

(*) Notice: Subject to any disclaimer, the term of this patent is extended or adjusted under 35 U.S.C. 154(b) by 81 days.

(21) Appl. No.: 15/620,969

(22) Filed: Jun. 13, 2017

(51) Int. Cl.
| | |
|---|---|
| *G06Q 10/08* | (2012.01) |
| *A24F 15/00* | (2006.01) |
| *A47F 1/04* | (2006.01) |
| *A47F 5/00* | (2006.01) |
| *A24F 15/04* | (2006.01) |

(52) U.S. Cl.
CPC .............. *A24F 15/005* (2013.01); *A47F 1/04* (2013.01); *A47F 5/0025* (2013.01); *A24F 15/04* (2013.01)

(58) Field of Classification Search
CPC ..................... G06Q 10/087; G06Q 10/0875
USPC ................................ 235/385, 375, 487, 381
See application file for complete search history.

(56) References Cited

U.S. PATENT DOCUMENTS

| | | | |
|---|---|---|---|
| 5,918,954 A | * | 7/1999 | Papadakis ............... A47F 3/005 312/126 |
| 6,752,277 B1 | | 6/2004 | Sempliner |
| 7,233,241 B2 | | 6/2007 | Overhultz |
| D655,107 S | | 3/2012 | Clark |
| 8,823,521 B2 | | 9/2014 | Overhultz |
| 9,504,321 B2 | | 11/2016 | Hardy |
| 10,026,057 B1 | * | 7/2018 | Elsherif ............... G06Q 10/087 |
| 2005/0040123 A1 | | 2/2005 | Ali |
| 2011/0015781 A1 | * | 1/2011 | Vardaro ............. B65D 83/0418 700/231 |
| 2014/0110481 A1 | | 4/2014 | Burnside |
| 2016/0316938 A1 | * | 11/2016 | Cruttenden ............. A47F 1/125 |

* cited by examiner

*Primary Examiner* — Edwyn Labaze

(57) ABSTRACT

The cigarette rack with inventory check comprises a package rack, a plurality of digital tape measures, and a control device. The package rack stores as individual packs each pack contained within the plurality of prepackaged smoking materials. The plurality of prepackaged smoking materials are organized into one or more stacks. Each of the plurality of digital tape measures measures the length of an outer dimension of a stack selected from the one or more stacks to determine the count of packs contained within the selected stack. The control system counts the number of packs contained within each of the one or more stacks. The control system displays: 1) the number of packs contained within each of the one or more stacks; and, 2) the price of an individual pack contained within the selected stack.

12 Claims, 4 Drawing Sheets

CIGARETTE RACK WITH INVENTORY CHECK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and counting, more specifically, a device for counting objects in a stack.

SUMMARY OF INVENTION

The cigarette rack with inventory check is configured for use with a plurality of prepackaged smoking materials. Each of the plurality of prepackaged smoking materials is a container, referred to as a pack, which is formed in a shape selected from the group consisting of a rectangular block or a disk. It is anticipated that the pack will contain a premeasured quantity of a smoking material. Each pack contained within the plurality of prepackaged smoking materials is further defined with predetermined outer dimensions. Each pack selected from the plurality of prepackaged smoking materials is identical such that the outer dimensions of each pack contained within the plurality of prepackaged smoking materials are identical. The consistency of the outer dimensions of each pack contained within the plurality of prepackaged smoking materials allows a number of packs in the stack of packs to be accurately estimated by measuring the outer dimensions of the stack.

The cigarette rack with inventory check comprises a package rack, a plurality of digital tape measures, and a control device. The package rack stores as individual packs each pack contained within the plurality of prepackaged smoking materials. The plurality of prepackaged smoking materials are organized into one or more stacks. Each of the plurality of digital tape measures measures the length of an outer dimension of a stack selected from the one or more stacks to determine the count of packs contained within the selected stack. The control system counts the number of packs contained within each of the one or more stacks. The control system displays: 1) the number of packs contained within each of the one or more stacks; and, 2) the price of an individual pack contained within the selected stack.

These together with additional objects, features and advantages of the cigarette rack with inventory check will be readily apparent to those of ordinary skill in the art upon reading the following detailed description of the presently preferred, but nonetheless illustrative, embodiments when taken in conjunction with the accompanying drawings.

In this respect, before explaining the current embodiments of the cigarette rack with inventory check in detail, it is to be understood that the cigarette rack with inventory check is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cigarette rack with inventory check.

It is therefore important that the claims be regarded as including such equivalent construction insofar as they do not depart from the spirit and scope of the cigarette rack with inventory check. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
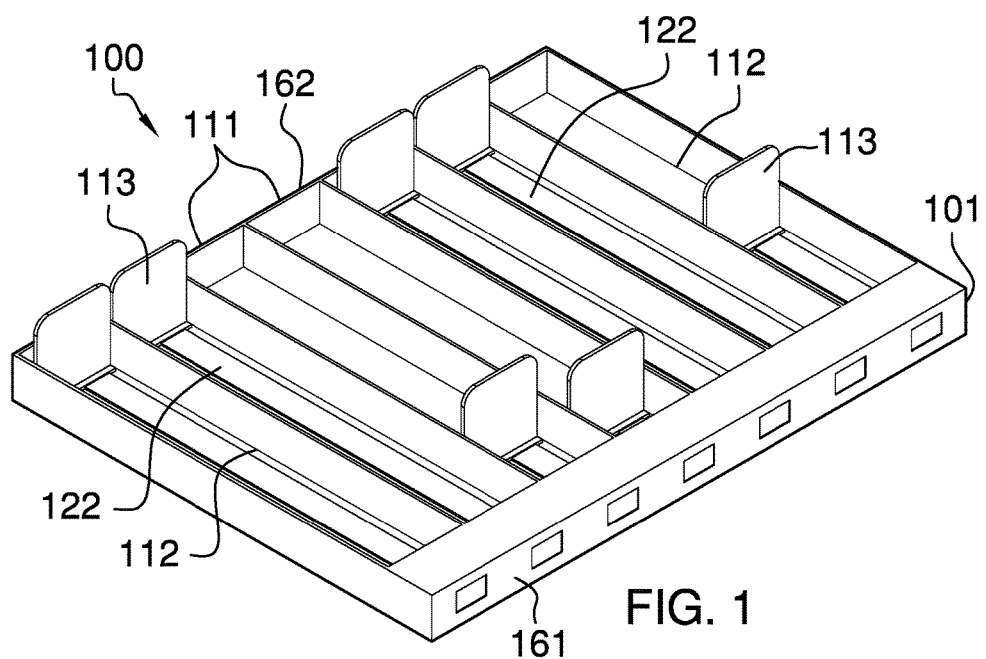
FIG. 1 is a perspective view of an embodiment of the disclosure.
Figure 2:
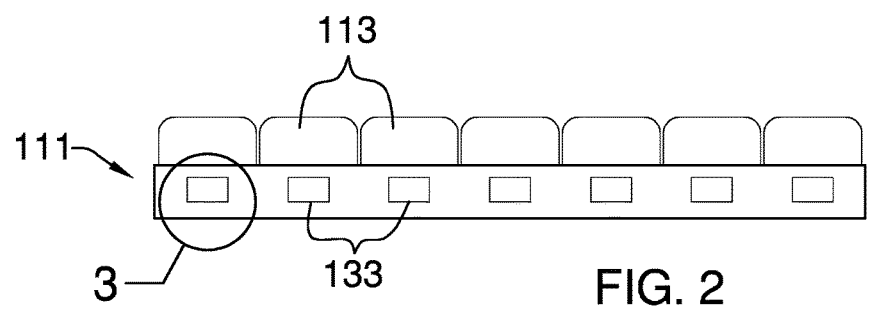
FIG. 2 is a front view of an embodiment of the disclosure.
Figure 3:
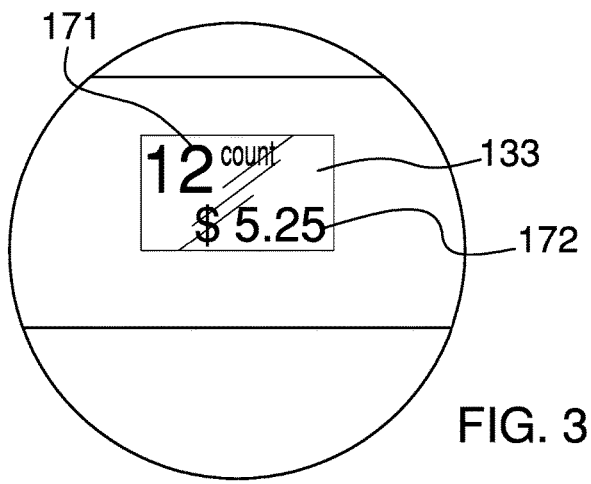
FIG. 3 is a detail view of an embodiment of the disclosure.
Figure 4:
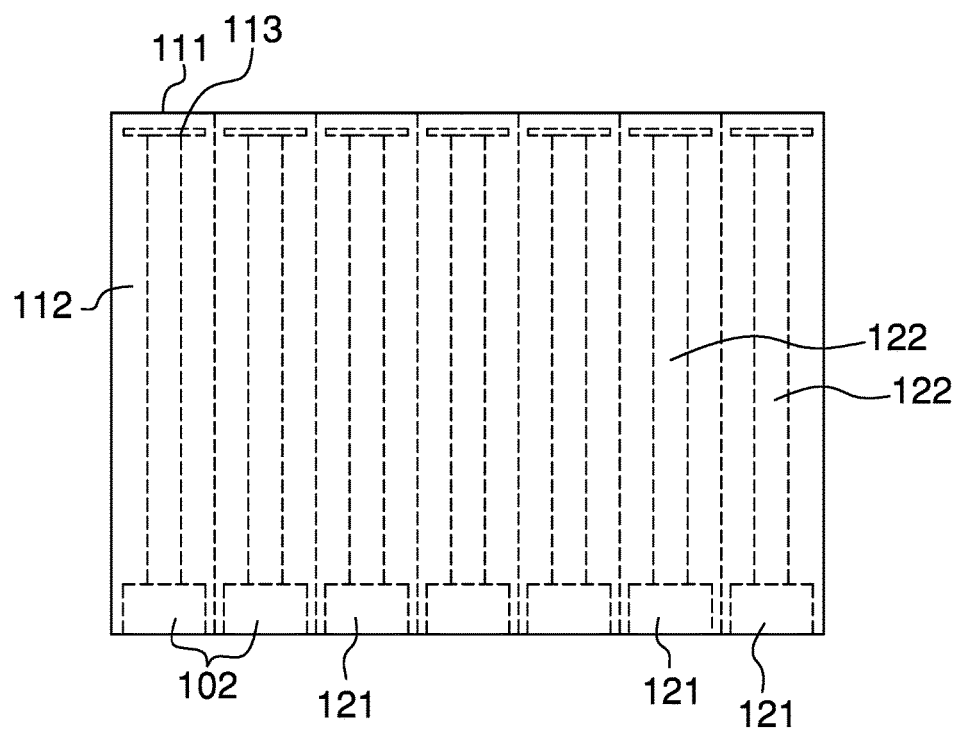
FIG. 4 is a top view of an embodiment of the disclosure.
Figure 5:
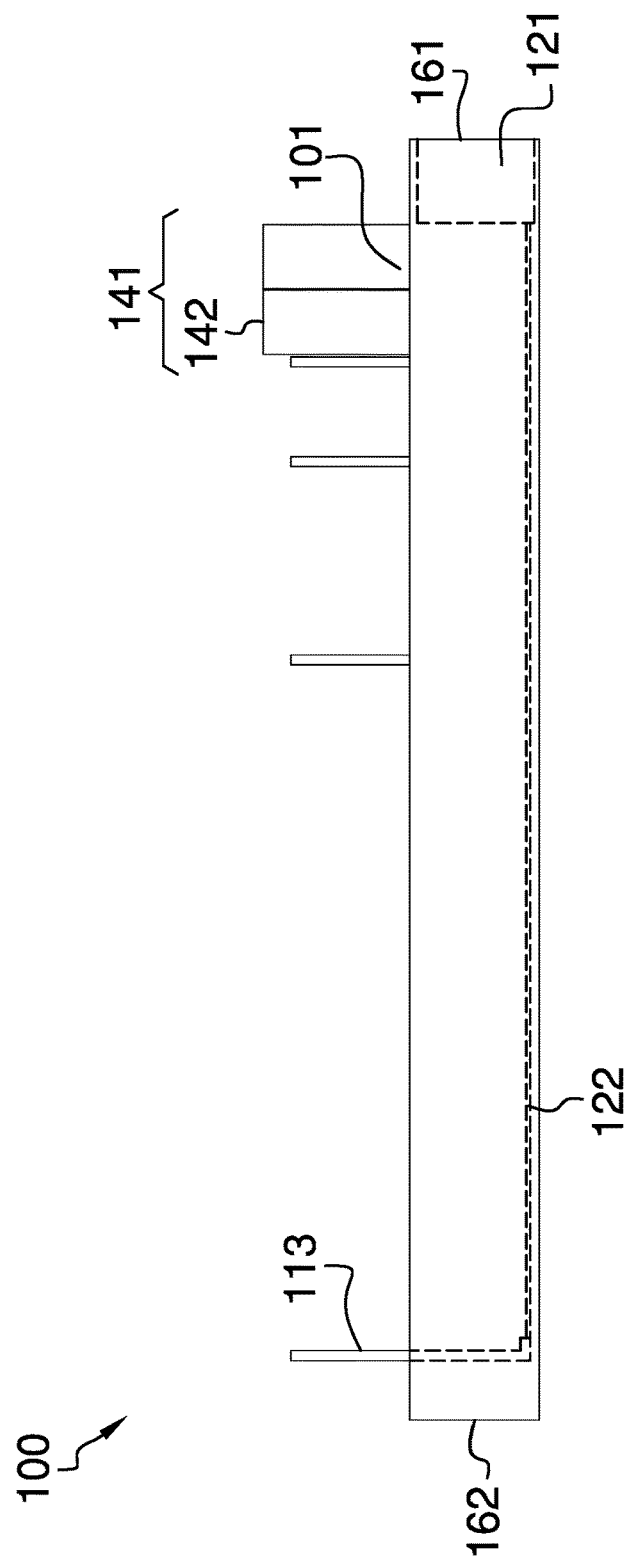
FIG. 5 is a side view of an embodiment of the disclosure.
Figure 6:
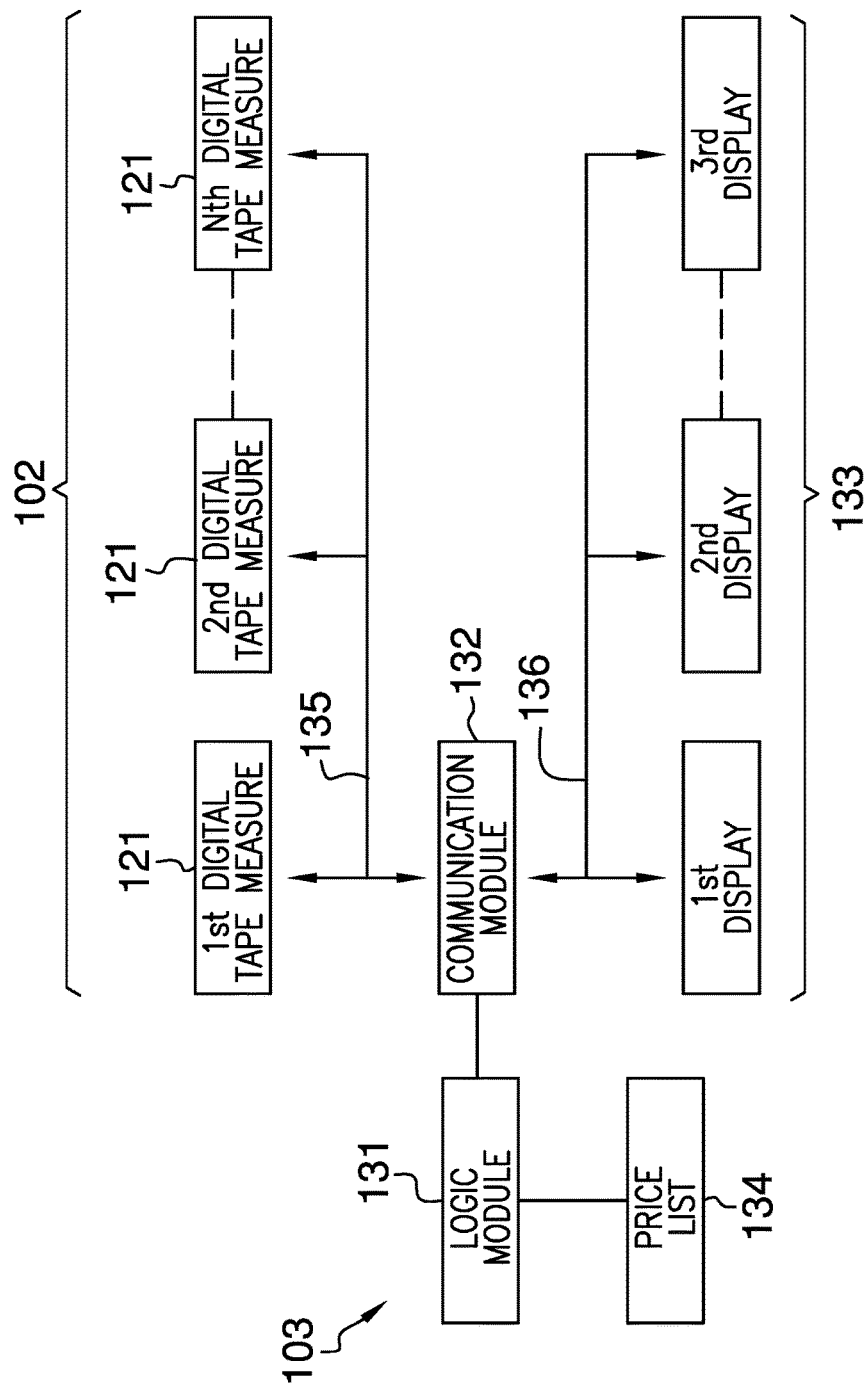
FIG. 6 is a block diagram of an embodiment of the disclosure.

Detailed reference will now be made to one or more potential embodiments of the disclosure, which are illustrated in FIGS. 1 through 6.

The cigarette rack with inventory check 100 (hereinafter invention) is configured for use with a plurality of prepackaged smoking materials 141. Each of the plurality of prepackaged smoking materials 141 is a container, referred to as a pack 142, which is formed in a shape selected from the group consisting of a rectangular block or a disk. It is anticipated that the pack 142 will contain a premeasured quantity of a smoking material. Each pack 142 contained within the plurality of prepackaged smoking materials 141 is further defined with predetermined outer dimensions. Each pack 142 selected from the plurality of prepackaged smoking materials 141 is identical such that the outer dimensions of each pack 142 contained within the plurality of prepackaged smoking materials 141 are identical. The consistency of the outer dimensions of each pack 142 contained within the plurality of prepackaged smoking materials 141 allows a number of packs 142 in the stack of packs 142 to be accurately estimated by measuring the outer dimensions of the stack of packs 142.

The invention 100 comprises a package rack 101, a plurality of digital tape measures 102, and a control device 103. The package rack 101 stores as individual packs 142 each pack 142 contained within the plurality of prepackaged smoking materials 141. The plurality of prepackaged smoking materials 141 are organized into one or more stacks of packs 142. Each of the plurality of digital tape measures 102 measures the length of an outer dimension of a stack of packs 142 selected from the one or more stacks of packs 142 to determine the count of packs 142 contained within the selected stack of packs 142. The control system counts the number of packs 142 contained within each of the one or more stacks of packs 142. The control system displays: 1) the number of packs 142 contained within each of the one or more stacks of packs 142; and, 2) the price of an individual pack 142 contained within the selected stack of packs 142.

In the first potential embodiment of the disclosure, it is anticipated that the invention 100 will be formed as an integrated single unit. Nevertheless, within this disclosure it will be assumed that the invention 100 is formed as a modification to a readily and commercially available package rack 101. This assumption is made for the purposes of simplicity and clarity of exposition and is not intended to limit the scope of this disclosure. Those skilled in the mechanical arts will recognize that this simplifying assumption will not in any way limit the operation of the invention 100 and should not be interpreted to in any way limit the scope of the claims.

The package rack 101 is a commercially available tobacco rack that is commonly used to organize and dispense individual packs 142 of smoking materials. The package rack 101 can be seen at most locations that sell individual packs 142 of tobacco based smoking materials. Within this disclosure, the package rack 101 is modified to accommodate the control device 103 described in this disclosure for the purpose of counting the individual packs 142 contained in the package rack 101.

The package rack 101 comprises an individual tray 111, a track 112, and a pushing device 113. The package rack 101 is further defined with a front side 161 and a rear side 162.

The individual tray 111 is configured to contain the individual packs 142 associated with any stack of packs 142 selected from the one or more stacks of packs 142. The individual tray 111 is further defined with a front side 161 and rear side 162 that correspond and align with the front side 161 and the rear side 162 of the package rack 101.

The track 112 is a hollow rectangular block structure within which a stack of packs 142 selected from the one or more stack of packs 142 is stored. Manufacturers of package racks 101 will commonly refer to a track 112 as a column.

The pushing device 113 is installed within the track 112. The pushing device 113 is a spring loaded plate shaped device that pushes the individual packs 142 contained within the selected track 112 to the front side 161 of the package rack 101.

Each of the plurality of digital tape measures 102 is a commercially available digital tape measure. Each individual digital tape measure 121 contained in the plurality of digital tape measures 102 is identical. Each of the plurality of digital tape measures 102 is a measuring device that comprises a: 1) calibrated tape 122 that is used to visually measure distance; and, 2) an electronic position sensor that confirms the visually measured distance electronically by measuring the amount of the calibrated tape 122 that has been deployed from an individual digital tape measure 121. Each of the plurality of digital tape measures 102 transmits the electronically measured distance as measured by their associated calibrated tape 122 to the control device 103 for processing.

The plurality of digital tape measures 102 comprises an individual digital tape measure 121. The individual digital tape measure 121 further comprises a dtm (digital tape measure) interface 135 and a calibrated tape 122.

The individual digital tape measure 121 is a readily and commercially available individual digital tape measure 121. The individual digital tape measure 121 is selected such that the individual digital tape measure 121 can communicate with a logic module 131 for the purpose of transferring data collected by the individual digital tape measure 121 to the logic module 131 for further processing The calibrated tape 122 is a bi-stable spring. The calibrated tape 122 acts in the manner of a mainspring. Bi-stable springs are commonly used in traditional tape measures for the purpose of visually measuring a distance. In the first potential embodiment of the disclosure, the calibrated tape 122 of the individual digital tape measure 121 forms the spring mechanism of the pushing device 113.

The individual digital tape measure 121 is installed within the individual tray 111 such that the calibrated tape 122 will pull the plate of the pushing device 113 towards the front side 161 of the individual tray 111. The action of the calibrated tape 122 pulling the plate of the pushing device 113 forward will sweep any individual packs 142 stored within the individual tray 111 towards the front side 161 of the individual tray 111.

The control device 103 is an electrical device. The control device 103: 1) calculates the overall pack 142 count 171 for the plurality of prepackaged smoking materials 141 stored within the package rack 101; 2) calculates the pack 142 count 171 for each stack selected form the one or more stacks of packs 142 contained within the package rack 101; 3) displays the pack 142 count 171 for each stack of packs 142 selected from the one or more stacks of packs 142; 4) maintains a price list 134 for an individual pack 142 selected from any stack of packs 142 selected from the one or more stacks of packs 142; and, 5) displays the price selected from the price list 134 for an individual pack 142 sold from any selected stack of packs 142. The control device 103 comprises a logic module 131, a communication module 132, a plurality of displays 133, a price list 134, the dtm interface 135, and a display interface 136.

The logic module 131 is a readily and commercially available programmable electronic device that is used to manage, regulate, and operate the control device 103. Depending on the specific design and the selected components, the logic module 131 can be a separate component within the in control device 103 or the functions of the logic module 131 can be incorporated into another component within the control device 103. The communication module 132 is a readily and commercially available electronic communication device that allows the logic module 131 to communicate with the plurality of tape measures 102 and the plurality of displays 133. In the first potential embodiment of the disclosure, the communication module 132 is a wireless device that uses the Bluetooth protocol. The Bluetooth protocol is preferred over the WiFi protocol because of the greater commercial availability of digital tape measures that support the Bluetooth protocol.

Each of the plurality of displays 133 is used to display the pack 142 count 171 and the sales price 172 for the individual packs 142 that are associated with the individual tray 111 that corresponds to the selected display. Each of the plurality of displays 133 is a commercially available electronic display. In the first potential embodiment of the disclosure, each of the plurality of displays 133: 1) is identical; and, 2) is an LCD display. Each of the plurality of displays 133 forms a one to one correspondence with an individual tray 111 selected from the package rack 101. In a second potential embodiment of the disclosure, the plurality of displays 133 are provisioned using the display from each of the plurality of digital tape measures 102. Each of the plurality of displays 133 is mounted in the front side 161 of the package rack 101.

The price list 134 is a database that is stored within the logic module 131. The price list 134 maintains the sales price 172 for any individual pack 142 contained within the plurality of prepackaged smoking materials 141.

The dtm interface 135 refers to the communication protocols and communications between the individual digital tape measure 121 and the logic module 131. It is preferred that the communication module 132 and each individual digital tape measure 121 use a Bluetooth protocol. The dtm interface 135 is used to communicate the measurement data collected from the individual digital tape measure 121 to the logic module 131 through the communication module 132 for processing.

The display interface 136 refers to the communication protocols and communications between the logic module 131 and each of the plurality of displays 133. The display interface 136 transfers the pack 142 count 171 and the sales price 172 from the logic module 131 through the communication module 132 to each of the plurality of displays 133. The pack 142 count 171 refers to the number of packs 142 contained within a selected individual tray 111. The sales price 172 refers to the price of an individual pack 142 contained within a selected individual tray 111.

In the first potential embodiment of the disclosure, the logic module 131 is provisioned as an app that is operated on a personal data device.

The following definitions were used in this disclosure:

Align: As used in this disclosure, align refers to an arrangement of objects that are: 1) arranged in a straight plane or line; or, 2) arranged to give a directional sense of a plurality of parallel planes or lines.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to receive alarm or other notification messages regarding a monitored system or activity.

Bi-Stable Spring: As used in this disclosure, a bi-stable spring is a type of mainspring wherein the bi-stable spring has a second stable state that exists when the bi-stable spring is fully extended (or unwound). Bi-stable springs are commercially available and are commonly referred to as slap bands or slap bracelets. The most common bi-stable springs will coil along the length direction and will have an arch across the width direction. Commercially available bi-stable springs are often coated in a silicone based coating.

Bluetooth: As used in this disclosure, Bluetooth is a standardized communication protocol that is used to wirelessly interconnect electronic devices.

Correspond: As used in this disclosure, the term correspond means that a first object is in some manner linked to a second object in a one to one relationship.

Database: As used in this disclosure, a database refers to: 1) a set of data that is organized and stored in a manner that allows for the search and retrieval of data from the data set; or, 2) the electronic device that stores and organizes a data set as described in the first definition.

Disk: As used in this disclosure, a disk is a cylindrically shaped object that is flat in appearance.

Display: As used in this disclosure, a display is a surface upon which is presented an image, potentially including, but not limited to, graphic images and text, that is interpretable by an individual viewing the projected image in a meaningful manner.

Interface: As used in this disclosure, an interface is a physical or virtual boundary that separates two different systems across which information is exchanged.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Mainspring: As used in this disclosure, a mainspring is a spiral torsion spring made of a metal tape. Energy is stored in a mainspring by twisting the spiral tighter. Mainsprings are commonly found in watches. Mainsprings are also commonly referred to as coiled ribbon springs or coiled flat springs.

Multi-Stable: As used in this disclosure, an object or system is considered multi-stable when the object or system has more than one set of (non-trivial) conditions within which the object or system will exhibit stability. An object or system with two such stable "states" is called bi-stable.

One to One: When used in this disclosure, a one to one relationship means that a first element selected from first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Personal Data Device: As used in this disclosure, a personal data device is a handheld device that is used for managing personal information and communication. Examples of personal data device include, but are not limited to, cellular phones, tablets and smart phones.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance.

Rectangular Block: As used in this disclosure, a rectangular block refers to a three dimensional structure comprising six rectangular surfaces formed at right angles. Within this disclosure, a rectangular block may further comprises rounded edges and corners.

Smoking Material: As used in this disclosure, smoking materials are combustible materials that are intended to be deeply inhaled while they are being burned. This definition is intended to include, but is not limited to, tobacco and materials that exhibit pharmacological activity such as marijuana. This definition is intended to exclude combustible materials that are burned as a perfume but that are generally not purposefully inhaled including, but not limited to, incense and scented oils.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Strip: As used in this disclosure, the term describes a long thin object of uniform width. Strips are often rectangular blocks in shape.

Tape: As used in this disclosure, tape refers to a flexible and narrow strip of material.

Track: As used in this disclosure, a track is a device that is used to control the path of motion of an object in at least one dimension and in a maximum of two dimensions.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A counting device comprising:
a package rack, a plurality of digital tape measures, and a control device;
wherein the plurality of digital tape measures are mounted in the package racks;
wherein the plurality of digital tap measures are electrically connected to the control device;
wherein the electrical connection is selected from the group consisting of a wired connection or a wireless connection;
wherein the counting device is configured for use with a plurality of prepackaged smoking materials;
wherein each of the plurality of prepackaged smoking materials is formed as a pack;
wherein each pack contained within the plurality of prepackaged smoking materials is further defined with predetermined outer dimensions;
wherein each pack selected from the plurality of prepackaged smoking materials is identical;
wherein the package rack stores each pack contained within the plurality of prepackaged smoking materials;
wherein the plurality of prepackaged smoking materials are organized into one or more stacks of packs;
wherein each of the plurality of digital tape measures measures the length of an outer dimension of a stack of packs selected from the one or more stacks of packs;
wherein the control system calculates the number of packs contained within each of the one or more stacks of packs;
wherein the control system displays the number of packs contained within each of the one or more stacks of packs;
wherein the control system displays the price of an individual pack contained within the selected stack of packs;
wherein the package rack comprises an individual tray, a track, and a pushing device;
wherein the track and the pushing device form the individual tray;
wherein the package rack is further defined with a front side and a rear side;
wherein the individual tray is configured to contain the individual packs associated with any stack of packs selected from the one or more stacks of packs;
wherein the individual tray is further defined with a front side and rear side that correspond and align with the front side and the rear side of the package rack;
wherein the track is a hollow rectangular block structure within which a stack of packs selected from the one or more stack of packs is stored;
wherein the pushing device is installed within the track;
wherein the pushing device comprises a plate;
wherein the pushing device comprises a spring mechanism;
wherein each individual digital tape measure contained in the plurality of digital tape measures is identical;
wherein each of the plurality of digital tape measures comprises a measuring device that comprises a calibrated tape and a dtm interface;
wherein each of the plurality of digital tape measures comprises an electronic position sensor that measures the amount of the calibrated tape that has been deployed from an individual digital tape measure.

2. The counting device according to claim 1 wherein each of the plurality of digital tape measures transmits the electronically measured distance as measured by their associated calibrated tape to the control device over the dtm interface.

3. The counting device according to claim 2 the calibrated tape is a bi-stable spring.

4. The counting device according to claim 3 wherein the calibrated tape of the individual digital tape measure forms the spring mechanism of the pushing device.

5. The counting device according to claim 4 wherein each individual digital tape measure is installed within the individual tray such that the calibrated tape will pull the plate of the pushing device towards the front side of the individual tray.

6. The counting device according to claim 5
wherein the control device is an electrical device;
wherein the control device calculates the overall pack count for the plurality of prepackaged smoking materials stored within the package rack;
wherein the control device calculates the pack count for each stack selected form the one or more stacks of packs contained within the package rack;
wherein the control device displays the pack count for each stack of packs selected from the one or more stacks of packs.

7. The counting device according to claim 6
wherein the control device wherein the control device comprises a logic module, a communication module, a plurality of displays, a price list, the dtm interface, and a display interface;
wherein the logic module, the communication module, the plurality of displays, the price list, the dtm interface, and the display interface are electrically interconnected;
wherein the price list stores the sales price for an individual pack selected from any stack of packs selected from the one or more stacks of packs;
wherein the control device displays the sales price selected from the price list for an individual pack sold from any selected stack of packs;
wherein the price list is a database that is stored within the logic module;
wherein the logic module is a programmable electronic device;
wherein the communication module is an electronic communication device that allows the logic module to communicate with the plurality of tape measures and the plurality of displays.

8. The counting device according to claim 7
wherein each of the plurality of displays forms a one to one correspondence with an individual tray selected from the package rack;
wherein each of the plurality of displays is used to display the pack count and the sales price for the individual packs that are stored within the individual tray;
wherein each of the plurality of displays is mounted in the front side of the package rack.

9. The counting device according to claim 8
wherein each of the plurality of displays is identical;
wherein each of the plurality of displays is an LCD display.

10. The counting device according to claim 9
wherein the dtm interface comprises a communication protocol and communications between the individual digital tape measure and the logic module;
wherein the dtm interface is used to communicate the measurement data collected from the individual digital tape measure to the logic module through the communication module for processing;
wherein the display interface comprises a communication protocol and communication between the logic module and each of the plurality of displays;
wherein the display interface transfers the pack count and the sales price from the logic module through the communication module to each of the plurality of displays.

11. The counting device according to claim 8 wherein each of the plurality of displays is provisioned using an individual digital tape measure selected from the plurality of digital tape measures.

12. The counting device according to claim 11
wherein the dtm interface comprises a communication protocol and communications between the individual digital tape measure and the logic module;
wherein the dtm interface is used to communicate the measurement data collected from the individual digital tape measure to the logic module through the communication module for processing;
wherein the display interface comprises a communication protocol and communication between the logic module and each of the plurality of displays;
wherein the display interface transfers the pack count and the sales price from the logic module through the communication module to each of the plurality of displays.

* * * * *